Nov. 4, 1969  G. E. BARKER  3,476,128
PULSED SOLENOID FORCE BALANCE DEVICE
Filed May 24, 1965  3 Sheets-Sheet 1

INVENTOR
GEORGE E. BARKER
BY
Robert J. Schaap
ATTORNEY

Nov. 4, 1969  G. E. BARKER  3,476,128
PULSED SOLENOID FORCE BALANCE DEVICE
Filed May 24, 1965  3 Sheets-Sheet 2

INVENTOR
GEORGE E. BARKER
BY
Robert J. Schaap
ATTORNEY

United States Patent Office 3,476,128
Patented Nov. 4, 1969

3,476,128
PULSED SOLENOID FORCE BALANCE DEVICE
George E. Barker, St. Louis, Mo., assignor to Monsanto Company, St. Louis, Mo., a corporation of Delaware
Continuation-in-part of application Ser. No. 412,921, Nov. 23, 1964. This application May 24, 1965, Ser. No. 458,244
Int. Cl. F16k 31/04
U.S. Cl. 137—1                             19 Claims

ABSTRACT OF THE DISCLOSURE

A force balance device which employs a pulsed-solenoid control valve capable of modulating control action by varying the voltage to the solenoid coil of the valve. By controlling the firing angle of consecutive pulses to the solenoid coil, the amplitude of vibration of the valve plunger is controlled, which in turn controls fluid flow through the valve. The firing angle is adjusted in response to a measured physical variable such as liquid level. A large pressure differential is maintained across the valve seat so that the force urging the valve plunger to a flow position is large in comparison to the other forces acting upon the valve plunger. A fixed discharge located in a downstream position creates an internal feedback across the valve which improves flow stability. This force balance device is capable of being used as a pressure transducer.

---

This application is a continuation-in-part of my co-pending application Ser. No. 412,921, filed Nov. 23, 1964, now Patent No. 3,424,951, and which relates to electrically operated control valves.

This invention relates in general to certain new and useful improvements in control valves, and more particularly to a pulsed solenoid control valve system which is capable of being used as a force-balance device.

Recently, the use of electronic instrumentation has grown steadily in the chemical processing industries. Today, it is not uncommon to find entire chemical processing plants which are provided with the necessary instrumentation for a complete electrical control. In fact, there have been many recent discoveries of instrumentation which are capable of process sensing and generation of control signals. A wide variety of process sensing and control generation instruments of this type are readily available and are adaptable to a multitude of applications.

However, the final control element, such as a modulating flow control valve, has not kept pace with the advancements in instrumentation for electrical control and generally is still pneumatically operated, such as the typical air-motor valve. Pneumatically operated control valves, such as the air-motor control valve was a logical development in chemical process instrumentation of the past, since many of the sensors used in processing equipment generated pneumatic pressure signals directly. Consequently, the air-motor control valve and similar devices filled a direct need. However, the presently available pneumatically operated control elements are not suitable for high response instrumentation required in modern automatic process control.

The recent developments in sensory equipment and control signal equipment for chemical processes require a fast-response control device. It is difficult to achieve a fast-response device with long pneumatic transfer lines associated with pneumatically operated control elements such as the conventional air-operated control valves. Although many manufacturers have attempted to produce a completely electric control valve, the valves thus far produced have not been completely successful. The existing electric control valves are generally constructed with an electric motor substituted for the air-motor and are, therefore, relatively expensive. Moreover, electric valves of this type are relatively slow in response compared to the rapid signals achieved by the recent sensory and control signal equipment. Furthermore, such valves are difficult to make "fail-safe" in the event of a power failure. Aside from the above, the other performance specifications for control valves and similar position control systems have become increasingly stringent, as the means realizing such systems have become increasingly complicated. In view of the limitations of pneumatic systems, the presently available control elements do not have a wide dynamic range and have a relatively low response speed. Furthermore, these control elements are characterized by a lack of precision and a relatively high inherent hysteresis, which affects the efficiency of the control elements.

The presently existing commercially available control valves are not capable of exhibiting a wide degree of utility. For example, the design of these control valves does not lend itself for construction of control valves of laboratory scale, pilot plant scale and commercial scale operation. Moreover, the presently available control valves or final control elements are not capable of being used in other than fluid flow control applications. For example, the presently existing final control elements could not be used in a dual function, such as a control valve and a pressure transmitter, or a transducer or similar type of sensor.

It is, therefore, the primary object of the present invention to provide a pulsed solenoid control valve system which is capable of controlling flow over a wide dynamic range.

It is another object of the present invention to provide a pulsed solenoid control valve device which is capable of generating internal negative feedback for improved flow stability.

It is a further object of the present invention to provide a pulsed solenoid control valve system of the type stated which can be used as a force-balance device.

It is an additional object of the present invention to provide a pulsed solenoid force-balance device of the type stated which can be used in both low pressure and high pressure fluid systems.

It is also an object of the present invention to provide a pulsed solenoid force-balance device of the type stated which is relatively simple in its operation, has a long operating life and is capable of being used in a wide variety of applications.

It is still a further object of the present invention to provide a pulsed solenoid force-balance device of the type stated which is capable of controlling flow rate as a linear function of the control voltage.

It is another salient object of the present invention to provide a pulsed solenoid force-balance device of the type stated which is adaptable for use in bench-scale equipment, pilot-plant equipment and commercial process equipment.

It is still another object of the present invention to provide a pulsed solenoid force-balance device of the type stated which can be built into a small compact unit, which is relatively inexpensive to manufacture and has a high degree of reliability.

With the above and other objects in view, my invention resides in the novel features of form, construction, arrangement, and combination of parts presently described and pointed out in the claims.

GENERAL DESCRIPTION

Generally speaking, the present invention resides in the use of the electrically operated control valve described in the aforementioned copending application, of which this application is a continuation-in-part as a pulsed-solenoid force-balance device. This force-balance device, by nature of the electrically operated control valve employed, exhibits a wide degree of versatility and can be employed in many applications such as a pressure sensor, differential pressure sensor, or so-called "D.P. sensor" or "Δ-Pressure sensor." The pulsed-solenoid force-balance device of the present invention can also be used as a pressure transmitter, a flow meter, a liquid level detector, a pneumatic ratio controller, a ratio totalizer, or in many other applications where a force-balance device could find employment.

The force-balance device of the present invention employs an electrically operable control valve which is capable of modulating control action by varying the voltage supplied to the coil of the control valve. The valve is designed to control fluid flow in response to changes of a measured physical variable, such as liquid level. Consequently, the electrically operable control valve can find a wide variety of uses, such as a liquid level controller, a differential pressure controller or a temperature controller. The valve is provided with inlet and outlet ports, the inlet port having a valve seat. A vibratory plunger shifts with respect to the valve seat for controlling the flow of fluid through the valve housing. The valve plunger is ferromagnetic and actuable by a solenoid coil which is associated with the valve housing and surrounds the plunger.

A control circuit is provided for measuring the changes in the measured physical variable. The control circuit generally includes a sensor for measuring the change of the sensed physical variable and a mechanism for converting the measured physical property change into a proportional resistance change. The control circuit also includes a relaxation oscillator which is designed to convert the proportional resistance change into a sequence of timed pulses. Finally, a silicon controlled rectifier is provided for transmitting current pulses in timed relationship to the solenoid coil for actuating the plunger. In effect, it is thereby possible to maintain controlled vibration of the plunger for regulating fluid flow in proportion to the change of the sensed physical variable.

A modified form of control circuit is also provided for measuring changes in the sensed physical variable. The modified form of control circuit is similar to the first embodiment and includes a sensor for measuring the changes in the sensed variable and a mechanism for converting the measured physical property into a proportional electrical change. However, the modified circuit is capable of converting the change in the sensed physical variable into a proportional voltage or current change, rather than a resistance change.

The explanation of this flow control phenomenon involves a rather new control principle, namely, controlled mechanical vibration of the plunger at line frequency. This mechanical vibration is a forced vibration caused by the pulsating force exerted on the plunger by the solenoid coil. During the pulse cycle, the force exerted on the plunger starts from a zero level, reaches a maximum level, and returns to a zero level. If the average force exerted on the plunger by this pulsating voltage application is equal to or greater than the spring force which is designed to hold the plunger in a closed position, the plunger will snap open in a conventional solenoid valve fashion. If however, the average force exerted on the plunger by the coil is less than the spring force, but the maximum force is greater than the spring force, then the plunger will be lifted from the valve seat during a portion of the pulse cycle. During the lift portion of the cycle, the motion of the plunger can then be described by conventional force-mass differential equations. The effective valve opening can then be conveniently described by the time integral of the vertical lift of the plunger.

If the electrically operated control valve of the aforementioned copending application is considered as a flow control device, the effect of a pressure differential across the seat is considered a detriment to operation since the "set-point" of the valve changes with differential pressure. However, if the valve is considered as a force-balance device, this effect operates to the advantage of the valve. As mentioned above, the pulsed-solenoid force-balance device of the present invention is also capable of being employed in a number of force-balance applications such as a differential pressure sensor, or a flow meter, or as a liquid level detector etc. The present application also describes the force balance device in one of such applications in detail as a differential pressure sensor.

At low flow rates, vibration amplitude is very low and flow occurs very near the "lift-off" point of the valve plunger. In other words, when the maximum magnetic force on the valve plunger just equals the resultant of the other forces on the moving plunger, fluid flow through the valve will begin. If the valve is used in a flow-to-open pattern, any pressure differential across the seat will oppose the spring force holding the plunger closed. Then, for a given maximum magnetic force, the differential pressure across the seat will determine when flow begins. Thus, it can be seen that the valve will tend to maintain a constant pressure differential across itself. In the force-balance action, the valve seat area should be as large as possible. In essence, the force on the plunger produced by the pressure differential across the valve should be large in comparison to the other forces acting on the valve. It can thus be seen that the valve employed to produce the force-balance device of the present invention acts as a magnetically operated pop-off valve. When a fixed orifice is placed in a downstream position of the control valve, discharging to a constant lower pressure source, an internal feedback is produced which materially improves the flow stability.

The present invention also contemplates the use of the pulsed-solenoid force-balance control valve as a resistance-pneumatic transducer having linear characteristics. The flow rate through the valve is a linear function of the control resistance. With the modified form of control circuit provided which is capable of generating pulse signals in response to a voltage input rather than a resistance input, it is thus possible to provide an electro-pneumatic transducer with linear characteristics.

DETAILED DESCRIPTION

Figures 1, 2:
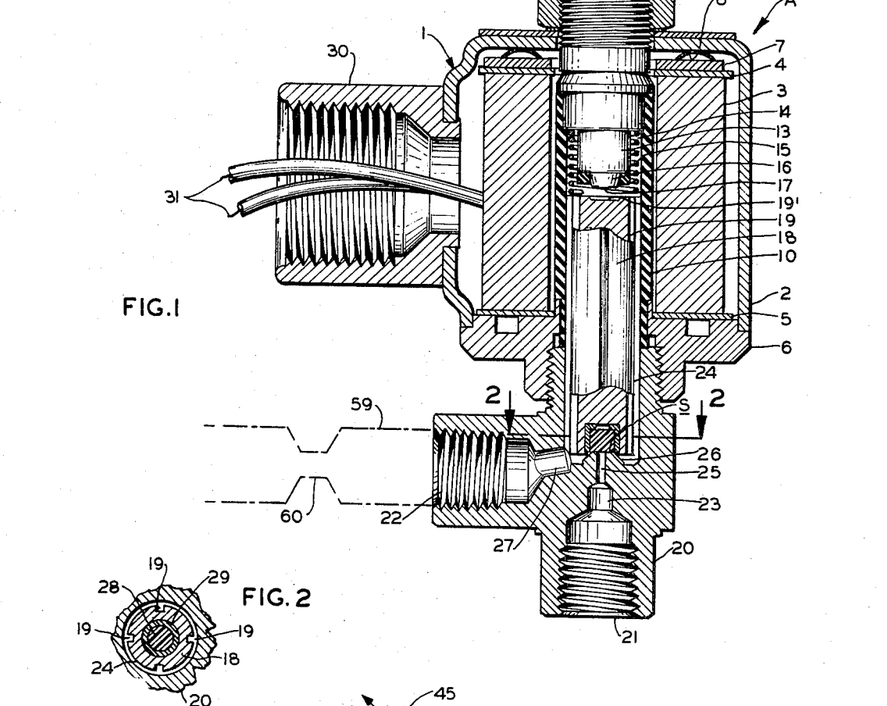
FIGURE 1 is a vertical sectional view, partially broken away, of a pulsed-solenoid force-balance device constructed in accordance with and embodying the present invention.
FIGURE 2 is a fragmentary sectional view taken along line 2—2 of FIGURE 1.
Figure 3:
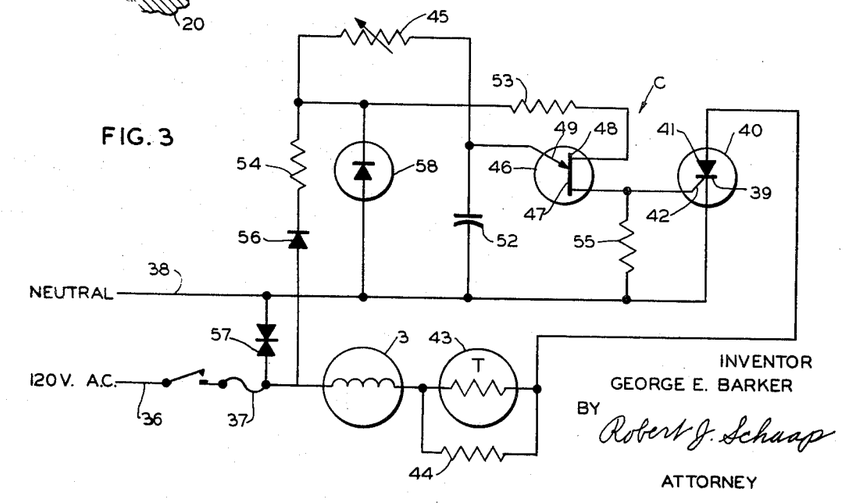
FIGURE 3 is a diagrammatic view of a control circuit used with the pulsed-solenoid force-balance device of FIGURE 1.

Referring now in more detail and by reference characters to the drawings which illustrate practical embodiments of the present invention, A designates a force-balance device comprising a pulsed-solenoid control valve B substantially as shown in FIGURES 1 and 2. The control valve B is operatively connected to and operable by a control circuit C, substantially as shown in FIGURE 3.

The control valve B generally comprises an outer control valve housing 1 including a somewhat cylindrical coil housing 2. Disposed within the housing 2 is a helically wound cylindrical solenoid coil 3 and disposed upon opposite ends thereof are upper and lower insulating washers 4 and 5, respectively. The insulating washer 5 is facewise disposed upon the upper surface of a base plate 6 which forms part of the outer coil housing 2. Facewise disposed upon the upper insulating washer 4 is a circular flux plate 7. The assembly of the solenoid coil 3, the insulating washers 4, 5 and the flux plate 7 is suitably held in place and urged downwardly toward the base plate 6 by means of a set of flat springs 8. By reference to FIGURE 1, it can be seen that the springs 8 are interposed between the upper surface of the flux plate 7 and the undersurface of the top wall forming part of the coil housing 2.

The coil housing 2 and the solenoid coil 3 are centrally apertured to accommodate a plunger tube assembly 9 which comprises a cylindrical tube 10 disposed axially within the coil housing 2 and which contains a central non-magnetic section surrounded by magnetic sections at each transverse end. Secured to the upper end of the tube 10 is a plug 11 which is retained by a nut 12, substantially as shown in FIGURE 1. The plug 11 projects inwardly into the tube 10 and at its lower end, is diametrically reduced in the provision of a downwardly extending boss 13, thereby providing an annular relief 14 for accommodating a compression spring 15. Integrally formed with and extending downwardly from the lower end of the boss 13 is a projection 16, the lower face of which serves as a plunger stop 17. Reciprocatively disposed within the tube 10 and being adapted for vibratory movement is a valve plunger 18 which is provided with four radially spaced axially extending fluid ducts or reliefs 19. At its upper end, the plunger 18 is milled to provide a plunger head 19'.

Threadedly secured to the lower end of the base plate 6 is a valve body 20 which is axially drilled from its base to form an inlet port 21 and from one transverse end to an outlet port 22. The valve body 20 is also provided with a duct 23 communicating with a fluid chamber 24 formed by the tube 10. Communication is provided therebetween by an orifice 25 formed in an upstanding boss 26 integrally formed with the valve body 20. Thus, it can be seen that the fluid inlet port 21 communicates with the chamber 24 through the duct 23 and orifice 25. The outlet port 22 is maintained in communication with the chamber 24 through an axial duct 27 formed in the valve body 20, substantially as shown in FIGURE 1. The fluid ports 21, 22 are also internally threaded to accept standard pipe fittings. The upstanding boss 26 is machined with a flat head so that it suitably serves as a valve seat $s$.

The valve plunger 18 is internally bored from its bottom face to accommodate a disc 28 formed of a tetrafluoroethylene polymer normally marketed under the trade name "Teflon." The disc 28 is preferably surrounded by a stainless steel ring 29 as illustrated in FIGURE 1. The seat material, such as the Teflon, has a strong effect on secondary or rebound vibrations of a vibrating plunger. In general, the secondary vibrations are undesirable inasmuch as they adversely affect the stability of the valve. Moreover, much of the noise associated with pulsed solenoid operation is produced by secondary or rebound vibrations. In connection with the present invention, it was found that a seat formed of Teflon produced the most desirable results of any material analyzed. Teflon possessed a high elastic co-efficient but which was sufficient for an adequately stable range of operation. The rebound vibrations were sufficiently negligible and it was found that the valve seat $s$ had a rather extended life.

Improved stability is also achieved by preventing uncontrollable radial vibrations of the plunger 18. This can be accomplished by wrapping the upper end of the plunger with Teflon tape. Preferably, a tab (not shown) can be silver soldered on the valve body so that the tab keys into one of the reliefs or grooves 19 of the plunger 18. The groove, of course, is marked so that the plunger 18 may always be reassembled in the same position. This type of construction eliminates the effect of slight non-concentricity of the plunger 18 with the orifice 25 so that the orifice indentation on the seat $s$ is always in the same radial orientation.

The valve B is also provided with a fitting 30 for accommodating a pair of leads 31 to the solenoid coil 3, in the manner as shown in FIGURE 1. The leads 31 are ultimately connected to the control circuit C, which is schematically illustrated in FIGURE 3.

The control circuit C is powered from a 120 volt source of alternating electrical current (not shown) and includes a positive conductor 36 which is connected through a fuse 37 to the solenoid coil 3. The circuit C also includes a neutral conductor 38 which is connected to the cathode electrode 39 of a silicon controlled rectifier 40, the latter also including an anode electrode 41 and a gate electrode 42. The anode electrode 41 of the silicon controlled rectifier 40 is electrically connected through a thermistor 43 to the opposite terminal of the solenoid coil 3, substantially as shown in FIGURE 3. A fixed resistor 44 is shunted across the thermistor 43 for elimination of undesirable temperature effects. The firing angle of the basic voltage output of the control circuit C to the solenoid 3 is, of course, controlled by measured changes in the sensed physical variable, which is schematically illustrated by a variable resistor or so-called "control resistor" 45 in FIGURE 3.

The basic timing device that controls the firing angle of the circuit in relation to the measured change in the physical variable is a unijunction transistor 46 which is used as a relaxation oscillator. The unijunction transistor 46 is provided with a base-1 47, a base-2 48 and an emitter 49. The emitter 49 can be connected directly to the variable resistor 45 and is also connected to a capacitor 52, which is in turn connected to the neutral conductor 38. The base-2 48 of the transistor 46 is connected through a temperature compensating resistor 53 to a limiting resistor 54 and to the opposite terminal of the variable resistor 45. The base-1 47 of the transistor 46 is electrically connected to the gate electrode 42 of the silicon controlled rectifier 40 and to a fixed resistor 55 which is, in turn, connected to the neutral conductor 38. The limiting resistor 54 is also connected to the cathode portion of a diode 56 and to the conductor 36. A surge suppressor 57 is connected across the conductors 36, 38 for suppression of transient voltage. A Zener diode 58 is also connected across one terminal of the resistor 53 and the neutral conductor 38, in the manner as schematically illustrated in FIGURE 3.

In order to describe the operation of the control circuit, it must be recognized that the control resistor 45 is representative of the function which is being measured. It should, therefore, be understood that the resistor 45 can be conveniently replaced by a suitable sensory mechanism for measuring the changes of a physical variable which is capable of being converted into resistance changes, such as for example, a change in liquid level for level controlling and a change in temperature for temperature controlling. For example, if it were desired to convert the control circuit of FIGURE 2 into a liquid level controller, the circuit would be modified to include a resetting potentiometer and a suitable level sensory mechanism to replace the variable resistor 45. A cadmium sulfide sensor combined with a source of light to measure changes in liquid level by measurement of change in refractive index is one suitable sensory mechanism which can be employed. Consequently, it can be seen that the basic firing angle of the output voltage to the solenoid coil 3 is controlled by the changes in the sensed physical variable. Inasmuch as the sensed change of the physical variable is capable of being translated to an electrical change, such as a voltage, current or resistance change, this change can be physically represented by the variable resistor 45.

The unijunction transistor 46 which serves as the relaxation oscillator delivers a current pulse into the gate of the silicon controlled rectifier 40 at a controllable time within the positive cycle of the supply voltage from the source of electrical current. This current pulse is delivered to the gate electrode 42 of the silicon controlled rectifier 40 from the base-1 47 of the unijunction transistor 46. When the rectifier 40 receives this signal it will begin to conduct and will continue to conduct until the current attempts to reverse, at which time conventional diode action stops the current flow. From the above outlined construction, it can be seen that during the negative cycle no action will take place. The operation of the relaxation oscillator uses the principle of the unijunction transistor 46 that conduction between the emitter 49 and the base-1 47 is prevented unless the emitter to base-1 voltage is greater than a critical value, that critical value being determined by the base-2 voltage to the base-1 voltage. When this peak voltage is exceeded, the effective resistance between the emitter 49 and the base-1 47 drops and approaches a zero level. Conduction will continue until the emitter to base-1 voltage drops below the valley point voltage.

The diode 56 serves as a half-wave rectifier and provides control voltage for the unijunction transistor 46. The control voltage from the half-wave rectifier 56 is reduced and clipped by the limiting resistor 54 and the Zener diode 58 to produce a square wave voltage form. This square wave control voltage produced by this half-wave rectifying circuit consisting of the diode 56, the resistor 54 and the Zener diode 58, is transmitted both to the emitter 49 and to the base-2 48 through the temperature compensating resistor 53. The capacitor 52 in conjunction with the control resistor 45 determines the firing time of the unijunction transistor 46 and synchronization with the supply of alternating current is obtained by feeding the base-2 48 with the same square wave signal. The charge on the capacitor 52 is initially zero and it will begin to charge by flow of current through the control resistor 45. From the above, it can be seen that the lower the value of the control resistor, the faster will be the charging rate, and hence the rate of voltage rise at the emitter 49 of the unijunction transistor 46. However, during the time of the voltage rise at the emitter 49, the voltage difference maintained between the base-1 47 and the base-2 48 will be constant. When the voltage at the emitter 49 reaches its critical value, the unijunction transistor 46 will fire, thereby discharging the capacitor 52 through the resistor 55, permitting current flow into the gate electrode 42 of the silicon controlled rectifier 40. This pulse of current into the gate electrode 42 will cause the silicon controlled rectifier 40 to fire and to begin supply of current to the "load," which consists of the solenoid coil 3. When the control resistance is larger than the critical value, the capacitor 52 will not have charged to the firing voltage by the end of a positive cycle. Although this type of synchronization causes the unijunction transistor 46 to fire, only a small voltage is developed across the "load" under these conditions. As the control resistance is decreased from the critical value, the unijunction transistor 46 will fire appreciably earlier than the end of the half cycle, thereby causing the silicon controlled rectifier 40 to conduct for increasingly larger angles. After the unijunction transistor 46 has fired, the capacitor 52 will immediately begin to recharge and, if the resistance is low enough, may fire again before the end of the half cycle. However, since the silicon controlled rectifier 40 will already be in the conducting state, this additional pulse caused by the firing of the capacitor 52 will have no effect.

The wave form diagrams showing conversion of the sine wave provided by the source of alternating electrical current into the wave form transmitted from the silicon controlled rectifier to the solenoid coil 3 is more fully illustrated in the aforementioned copending application. From the above described control circuit, it can be observed that the basic voltage output of the controller is a half wave rectified sine wave. It can also be observed that the wave form has a positive firing angle and a portion which constitutes an "overshoot" with respect to time, the overshoot having a negative voltage. Due to the inductance of the coil 3, a minimum firing angle exists below which the silicon controlled rectifier 40 will not conduct even though it obtains firing pulses from the unijunction transistor 46. This condition is caused by the slow build-up of current due to the inductance of the coil 3. If, by the end of the firing pulse, the current has not built up to a point where it is greater than the holding current of the silicon controlled rectifier 40, then conduction will cease. This phenomenon, however, presents no problem with the circuit of the present invention, inasmuch as the minimum firing angle is below the value at which vibration begins.

After the silicon controlled rectifier 40 has fired, current will begin to flow in the solenoid coil 3 thereby generating magnetic flux which produces a force on the valve plunger 18. This increasing flux around the coil 3 also produces a back electromotive force which opposes the current flow into the coil 3. As the flux increases, the force on the plunger 18 increases until it balances the spring force holding the plunger 18 to the seated position, substantially as shown in FIGURE 1. At this instant, the plunger begins to move decreasing the air gap, that is the space between the plunger stop 17 and the plunger head 19' and further increases the flux around the coil 3. If a constant voltage were applied to the coil 3, this process would ultimately result in the plunger contacting the plunger stop 17. However, the voltage is reduced continually from the instant conduction has started where the firing angles are less than ninety degrees (90°). Thus, before the plunger 18 has reached the stop 17, the pull exerted by the solenoid coil 3 has been substantially reduced and eventually reaches a zero level, when the silicon controlled rectifier 40 stops conducting. By varying the firing angle of the silicon controlled rectifier 40, both the maximum force and the effective pulse width can be varied for causing changes of the effective valve openings.

Threadedly connected to the outlet port 22 is a discharge line 59 having a diametrally reduced portion 60 which constitutes a fixed orifice or fixed restriction. The discharge line 59 thereafter may discharge to any constant lower pressure source. The placing of the fixed orifice 60 on the downstream side of the control valve B produces a unique result of increased stability in that internal feedback or so-called "negative feedback" is produced. It is generally known that positive feedback produces an increased gain or a dynamic range but reduces the stability of a control, particularly in electrical circuits such as direct-coupled amplifiers. However, negative feedback in an electrical control circuit may reduce the gain, but increase the stability and reduces noise and distortion when generated in an amplifier. However, it has been found in connection with the present invention that the fixed restriction 60 produces the desired negative feedback which materially increases stability of the control valve.

The theory of providing increased stability by means of the negative feedback can be realized by analysis of the valve at very low flow rates. At low flow rates, the amplitude of vibration of the valve plunger is very low and flow will occur only near the "lift-off" point. In other words, the plunger will not move from its closurewise position on the valve seat until the peak magnetic force plus the force due to the pressure differential across the valve seat exceeds the net downward force on the valve plunger. As previously indicated, the net downward force on the valve plunger is the resultant force of the weight of the mass of the plunger and the force created by the spring. When the maximum magnetic force then equals the resultant of the other forces on the plunger, the valve plunger will lift from the valve seat. It can thus be seen that while the flow-to-open pattern is employed in the present device, the pressure differential across the valve seat will oppose the spring force holding the plunger in a closed position. Therefore, the differential pressure across the valve seat will determine the point when flow begins for a given maximum magnetic force.

As mentioned above, one of the forces involved in determining the conditions for the start of vibrations is the force produced by a pressure differential across the valve seat. As the seat area becomes larger or the pressure differential higher, this force becomes large in comparison to other forces acting on the valve. If the device is considered only as a flow control valve, this phenomenon is a decided disadvantage. However, this force can be used to advantage in stabilizing flow rate and linearizing the flow curve versus control voltage. If the seat area is made as large as possible to maximize the differential pressure force, improved performance is attainable if the valve is used in the flow-to-open pattern. Under these conditions, flow occurs very near the point of initial vibration, and under constant wave form to the coil, the valve will tend to maintain a constant pressure differential across itself.

Accordingly, it can be seen that it is the critical value of the maximum magnetic force, or peak magnetic force which determines the point at which flow begins. Below the critical magnetic force, no flow will pass through the valve. In essence, therefore, the valve B serves as a magnetically operated pop-off valve. The pop-off point can be controlled by controlling the electrical current to the coil.

Inasmuch as the inlet port is designed to create flow immediately beneath the valve seat so that there is a flow-to-open pattern, pressure on the upstream side of the valve B tends to move the valve plunger away from its seated position. This is, of course, balanced by the downward pressure created by the spring 15 and the mass of the plunger 18. When the maximum magnetic force and the upward force created by the upstream pressure exceeds the downward forces on the plunger, the plunger will move from the valve seat. However, it can be observed that the fluid surrounding the plunger tends to move the plunger to a closed position. Increased flow through the valve A will tend to build up a greater pressure on the upstream side of the restriction 60 within the discharge line 59. This increased pressure occurs within the chamber 24 and tends to force the valve plunger 18 to its closed or seated position. Consequently, there is a constant balancing of forces between the chamber 24 and the inlet port 21. This "internal feedback" which is produced reduces the differential pressure across the valve upon an increase of flow rate and thereby tends to lower the flow rate. Consequently, improved stability is achieved.

Aside from the fact that the "internal feedback" or so-called "negative feedback" produces an increased stability, this factor also provides uniqueness to the device A in that it is capable of being used as a resistance-pneumatic transducer with a linear characteristic. The transistorized control circuit C is used to produce a valve wave form so that a control resistance can yield a linear variation of the presure downstream of the control valve. The flow rate is, therefore, a linear function of the control resistance instead of an exponential function normally obtained.

A digital-pneumatic transducer of the type described would find excellent use in control applications in which the final control element is pneumatically operated. This type of transducer would, in effect, functionally convert a resistance input signal into a linearly proportional pneumatic output pressure.

The electropneumatic transducers of the prior art normally employ a DC electrical signal from a control circuit which causes a coil to shift with respect to the permanent magnet. Shifting of the coil normally causes movement of a beam which regulates the size of an orifice on a nozzle. A relay diaphragm assembly then shifts, thereby opening an inner valve to supply pressure. Air, as the operating medium, flows into the central chamber of the relay thereby increasing the output pressure until the relay diaphragm assembly is forced back to its original position and the inner valve is again closed. The increased output from the relay is operatively connected to the control valve and also to the feedback diaphragm. The force of the pressure on this diaphragm thereby acts on the beam. In this way, the relay output pressure is compared to the input signal by a force-balance principle. When a balance of the two forces exists, the relay output pressure is directly proportional to the input current. Thus, it can be seen that the motion of a coil as dictated by a control pulse moves a beam to cover and uncover a nozzle which, in turn, controls a diaphragm.

This type of electromagnetic transducer requires very accurate positioning of the components forming part of the electropneumatic transducer. It can thus be seen that the electropneumatic transducer produced by the pulsed-solenoid force-balance device of the present invention provides a superior type of transducing function inasmuch as extremely accurate settings are not required and that the pneumatic output is linearly related to the pulsed input.

Figure 4:
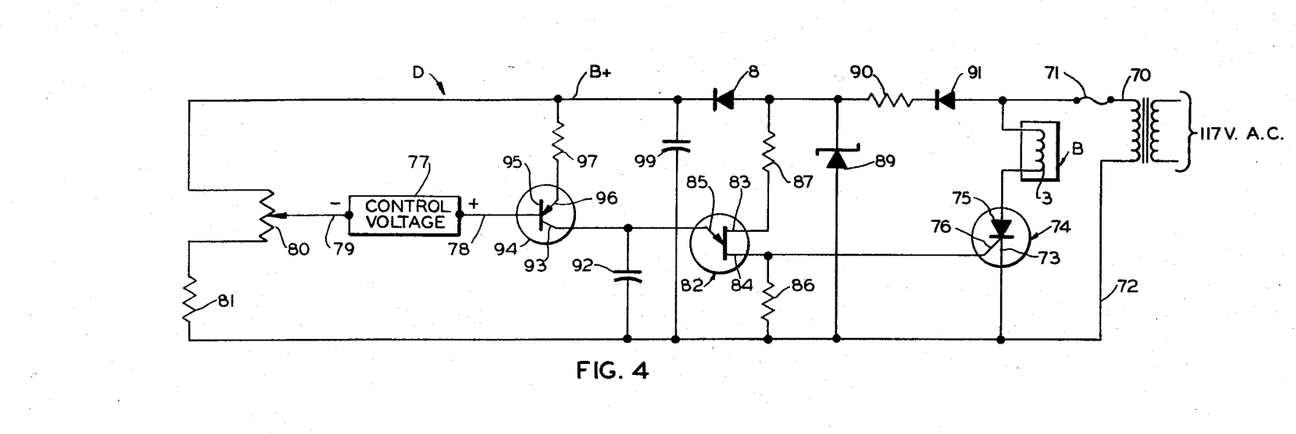
FIGURE 4 is a diagrammatic view of a modified form of control circuit used with the pulsed-solenoid force-balance device and which provides operation on a voltage input rather than a resistance input.

It is possible to provide a modified form of pulsed-solenoid force-balance control valve which is substantially similar to the force-balance device A except that the control valve employs a modified form of control circuit D, substantially as shown in FIGURE 4. The force-balance device A produces a flow pattern in response to a resistance input through the variable resistor 45. The modified form of pulsed solenoid force-balance control valve, however, is designed to produce a flow pattern in response to a voltage input. The modified form of pulsed-solenoid force-balance control valve also includes a valve body of the type employed in the control valve A and also includes a fixed restriction 60 on its downstream side to produce a negative feedback for increased stability.

The control circuit D as schematically shown in FIGURE 4 is powered from a 117 volt source of alternating electrical current (not shown) and includes a positive conductor 70 which is connected through a fuse 71 to the solenoid coil 3. The circuit D also includes a neutral conductor 72 which is connected to the cathode 73 of a silicon controlled rectifier 74, the latter also including an anode 75 and a base 76. The anode 75 of the silicon controlled rectifier 74 is electrically connected to the opposite terminal of the solenoid coil 3, substantially as shown in FIGURE 4. If desired, a thermistor (not shown) can be interposed between the silicon controlled rectifier 74 and the solenoid coil 3 to compensate for undesired temperature effects.

The firing angle of the basic voltage output of the control circuit D to the solenoid coil 3 is, of course, controlled by measured changes in a sensed physical variable. This change is measured in the form of a control voltage which is provided by any suitable electrical controller and is designated in FIGURE 5 as the control voltage source 77, having a positive terminal 78 and a negative terminal 79. The negative terminal 79 is connected to a reset potentiometer 80, which is in turn connected to a fixed resistor 81. The resistor 81 is in turn connected to the neutral conductor 72.

The basic timing device that controls the firing angle of the circuit in relation to the measured change in the physical variable is a unijunction transistor 82 which is provided with a base-1 83, a base-2 84 and an emitter 85. The base-1 83 is connected directly through a fixed resistor 86 to the neutral conductor 72. The base-2 84 is connected through a temperature compensating resistor 87 to a diode 88 and to one common terminal of a Zener diode 89. The base-1 83 is also electrically connected to the gate cathode 76 of the silicon controlled rectifier 74 as shown in FIGURE 4. One terminal of the Zener diode 89 is connected to the neutral conductor 72 and to a fixed resistor 90, which is in turn connected to a diode 91, the latter also being connected to the solenoid coil 3.

The emitter 85 is connected directly to a capacitor 92, which is in turn connected to the neutral conductor 72. The emitter 85 is also connected to a collector 93 of a P-N-P transistor 94, the latter serving as a "degenerated common emitter." The transistor 94 includes a base 95 and an emitter 96, the latter of which is in turn connected through a high impedance resistor 97 to a B+ line 98. The B+ line 98 is actually connected to the positive conductor 70 in the manner as schematically illustrated in FIGURE 4. Connected across the B+ line 98 and the neutral conductor 72 is a capacitor 99. A surge suppressor (not shown) can be connected across the positive conductor 70 and the neutral conductor 72, if desired, in order to suppress any transient voltage.

In order to describe the operation of the control circuit, it must be recognized that the control voltage source 77 is representative of the function which is being measured. It should, therefore, be understood that the control voltage source 77 can be conveniently replaced by a suitable sensory mechanism for measuring the changes of a physical variable which is capable of being converted into voltage changes. Consequently, it can be seen that the basic firing angle of the output voltage to the solenoid coil 3 is controlled by the changes in the sensed physical variable. Inasmuch as the sensed change of the physical variable is capable of being translated to an electrical change, such as a voltage or current change, this change can be physically represented by the control voltage source 77.

As a change occurs in a measured physical variable, which is measured by a controlled, a control voltage is transmitted to the control voltage source 77. This signal is then transmitted to the degenerated common emitter which is designed to convert voltage to current with a high source impedance. The collector 93 is designed to have a very high impedance so that the current through the degenerated common emitter 97 passes through the collector 93 to the capacitor 92. In normal operation, the emitter 96 would be controlled by the voltage in the voltage source 77. The size of the resistor 97 determines the current between the conductor 98 and emitter 96 and hence across the transistor 94. In essence, therefore, the voltage across the transistor 94, merely controls the collector current inasmuch as the current passes through the collector 93. The current passing through the collector 93 will charge the capacitor 92 until the capacitor reaches its saturation point. Consequently, it can be seen that a constant current application is maintained on the unijunction transistor 82, even during the negative half cycle thereof.

The unijunction transistor 82 which serves as the relaxation oscillator delivers a current pulse into the gate electrode 76 of the silicon controlled rectifier 74 at a controllable time within the positive cycle of the supply voltage from the source of electrical current. This current pulse is delivered to the gate electrode 76 of the silicon controlled rectifier 74 from the base-1 83 of the unijunction transistor 82. When the rectifier 74 receives this signal it will begin to conduct and will continue to conduct until the current attempts to reverse, at which time conventional diode action stops the current flow. However, current flow to the unijunction transistor 82 will continue from the capacitor 92. The operation of the relaxation oscillator uses the principle of the unijunction transistor 82 that conduction between the emitter 85 and base-1 83 is prevented unless the emitter to base-1 voltage is greater than a critical value, that critical value being determined by the base-2 voltage to the base-1 voltage. When this peak voltage is exceeded, the effective resistance between the emitter 85 atd the base-1 83 drops and approaches a zero level. Conduction should normally continue until the emitter to base-1 voltage drops below the valley point voltage.

The diode 88 serves as a half-wave rectifier and provides control voltage for the unijunction transistor 82. The control voltage from the half-wave rectifier 88 is reduced and clipped by the limiting resistor 87 and the Zener diode 89 to produce a square wave voltage form. This square wave control voltage produced by this half-wave rectifying circuit consisting of the diode 88, the resistor 87 and the Zener diode 89, is transmitted both to the emitter 75 and to the base-2 84 through the resistor 87. The control voltage source 77 determines the firing time of the unijunction transistor 82 and synchronization with the supply of alternating current is obtained by feeding the base-2 84 with the same square wave signal. The transistor 94, in combination with the capacitor 92 thus provides a constant current source. The size of the current is determined by the control voltage applied to the transistor 93.

The degenerated common emitter transistor 94 is designed to apply a constant current to the unijunction transistor 82. The voltage differential across the base 85 and the line connecting the resistor 97 and the reset potentiometer 80 determines the current in the emitter circuit of the transistor 94. The charging rate of the current is determined by the value of the resistor 97. The degenerated common emitter transistor 94 is designed to convert the voltage signal received from the control voltage source 77 to a linearly related current signal. The transistor 94 is designed to provide a constant current source regardless of the load maintained thereon, or of the voltage level because of the high source impedance. Similarly, low source impedance devices will deliver constant voltage flows.

If the unijunction transistor 82 is in a conductive state, current flow will be maintained from the base 93 to the emitter 85 of the unijunction transistor 82. If the unijunction transistor 82 is in a non-conductive state, that is it is not firing, the constant current flow from the degenerated common emitter transistor 94 will charge the capacitor 92. When the unijunction transistor 82 is rendered conductive, the capacitor 92 will discharge to the emitter 85 of the unijunction transistor 82. The maximum steady state current in the unijunction transistor must be less than the valley point current. In essence, the unijunction transistor 82 will remain on or in a conductive state all during the negative half cycle. However, at the end of the half cycle, the unijunction transistor 82 will be rendered conductive. At the start of the positive cycle, there is not sufficient emitter voltage in the unijunction transistor 82 so conduction is stopped and the transistor 94 is rendered non-conductive. At the start of the next half cycle, the interbase current is now flowing so there is a build up of voltage across the emitter. In fact, the emitter is back biased until there is a sufficient voltage build up across the emitter 85. However during the time of the voltage rise at the emitter 85, the voltage difference maintained between the base-1 83 and the base-2 84 will be constant. When the voltage at the emitter 85 reaches its critical value, the unijunction transistor 82 will fire, thereby discharging the capacitor 92 through the resistor 81, permitting current flow into the gate electrode 76 of the silicon controlled rectifier 74. This pulse of current into the gate electrode 76 will cause the silicon controlled rectifier 74 to fire and to begin supply of current to the "load," which consists of the solenoid coil 3.

When the control current is less than the critical value, the capacitor 92 will not have charged to the firing voltage by the end of a positive cycle. After the unijunction transistor 82 has fired, the capacitor 92 will immediately begin to recharge and, if the current is high enough, may fire again before the end of the half cycle. However, since the silicon controlled rectifier 74 will already be in the conducting state, this additional pulse caused by the firing of the capacitor 92 will have no effect.

Figures 5, 6:
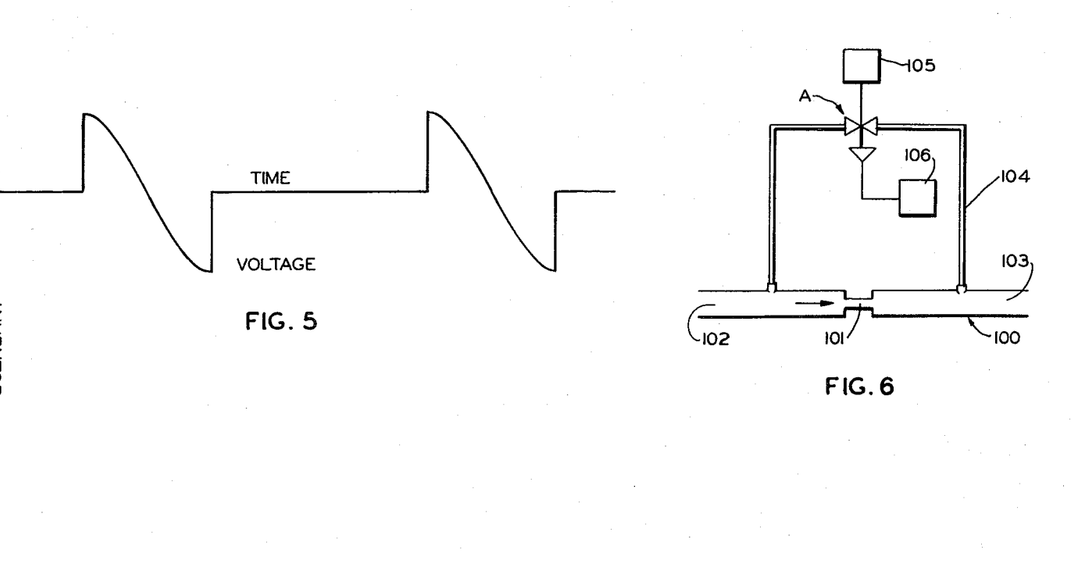
FIGURE 5 is a diagrammatic view of a wave form produced by the control circuit of FIGURE 4.
FIGURE 6 is a schematic view illustrating the use of the pulsed-solenoid force-balance device as a differential pressure sensor.

FIGURE 5 illustrates the conversion of the sine wave provided by the source of alternating electrical current into the wave form transmitted from the silicon controlled rectifier to the solenoid coil 3. It can be seen that the basic voltage output of the controller is a half wave rectified sine-wave. It can also be seen that the wave form has a positive firing angle and a portion which constitutes a slight "overshoot" with respect to time, the overshoot having a negative voltage. Due to the inductance of the coil 3, a minimum firing angle exists below which the silicon controlled rectifier 74 will not conduct even though it obtains firing pulses from the unijunction transistor 82. This condition is caused by the slow build-up of current due to the inductance of the coil 3. If, by the end of the firing pulse, the current has not built up to a point where it is greater than the holding current of the silicon controlled rectifier 74, then conduction will cease. This phenomenon, however, presents no problem with the circuit of the present invention, inasmuch as the minimum firing angle is below the value at which vibration begins.

After the silicon controlled rectifier 74 has fired, current will begin to flow in the solenoid coil 3 thereby generating magnetic flux which produces a force on the valve plunger 18. This increasing flux around the coil 3 also produces a back electromotive force which opposes the current flow into the coil 3. As the flux increases, the force on the plunger 18 increases until it balances the spring force holding the plunger 18 to the seated position, substantially as shown in FIGURE 1. At this instant, the plunger begins to move decreasing the air gap, that is the space between the plunger stop 17 and the plunger head 19' and further increases the flux around the coil 3. If a constant voltage were applied to the coil 3, this process would ultimately result in the plunger contacting the plunger stop 17. However, the voltage is reduced continually from the instant conduction has started where the firing angles are less than ninety degrees (90°). Thus, before the plunger 18 has reached the stop 17, the pull exerted by the solenoid coil 3 has been substantially reduced and eventually reaches a zero level, when the silicon controlled rectifier 74 stops conducting. By varying the firing angle of the silicon controlled rectifier 74, both the maximum force and the effective pulse width can be varied for causing changes of the effective valve openings.

Due to the fact that the pulsed-solenoid force-balance device A includes its own internal feedback, the device A exhibits stable performance over a wide range of operating variables. Moreover, the force-balance device A is very suitable for use in many feedback control applications where external feedback is employed, such as in liquid level control applications and pressure control applications. The pulsed-solenoid force-balance device A could also be modified and employed as an absolute pressure control system, a differential pressure control system, a gauge pressure control system and a temperature controller, for example. In order to modify the control circuit C into that of a flow controller, it is only necessary to use a differential manometer with a suitable sensory mechanism. In order to provide a pressure controller, it is only necessary to replace the variable resistor 45 with a pressure transducer to give an equivalent resistance change. If it were desired to modify the device A to make a temperature controller, it is only necessary to replace the variable resistor with a suitable thermistor used as a sensor.

By way of illustration, but not of limitation, the use of the pulsed-solenoid force-balance device A is exemplified by employment in a liquid level control application and a pressure control application.

In order to modify the pulsed solenoid force-balance control valve B into a liquid level controller, the control circuit of FIGURE 3 is slightly altered. The variable resistor 45 is replaced by a cadmium sulfide resistance type light sensitive transducer, often termed "sensor," which is used in conjunction with a light source for sensing changes of liquid level within a tube. It is preferable, though not necessary, to employ a constant voltage transformer (not shown) as the source of electrical current. The cadmium sulfide sensor is connected to a proportional band potentiometer and to the movable element of a reset potentiometer which may, in turn, be connected to another reset potentiometer. One reset potentiometer would serve as a means for wide range adjustment whereas the other reset potentiometer would serve as a means of final adjustment. These components forming part of the liquid level controller, namely the sensor, light source and potentiometer are neither illustrated nor described in detail herein. This control system is more fully described and illustrated in my copending application Ser. No. 412,921, filed Nov. 23, 1964, now Patent No. 3,424,951, of which this application is a continuation-in-part.

The actual sensing method of liquid level change was the refraction setting of a photocell, substantially as described in my copending application Ser. No. 323,383, filed Nov. 13, 1963, now U.S. Patent No. 3,311,834. The basic transducer is a cadmium sulfide photocell, the resistance of which decreases as light intensity increases. A collimated light source is directed perpendicular to the axis of the liquid level tube in a position off-center to the axis of the tube. The liquid in the tube has a higher index of refraction than the vapor phase and this causes the light beam to be refracted laterally when liquid is present. The cadmium sulfide receiver is mounted in a lateral position so that its light slit is illuminated when liquid is present and masked by the slit when vapor is present. While the liquid itself is used to provide change in light intensity by virtue of its refractive index, it should be understood that sensing by this method is equally efficient with clear or colored liquids.

Each of the potentiometers shunts the cadmium sulfide sensor and serves as a proportional band adjustment. One potentometer provides coarse adjustment whereas the other potentiometer provides fine adjustment and serves as a method of resetting the flow rate. It has been found that liquid level controllers which embody the pulsed-solenoid force-balance control valve A are very stable. This type of liquid level controller shows considerable utility by the extreme versatility of the control circuit. Moreover, it is possible to generate proportional level control with a proportional band up to 0.5 inch by this method.

The above described use of the liquid level control system illustrates that the pulsed-solenoid force-balance device A can be used in applications having external feedback. However, it has been found that through the internally generated feedback, the device A can be stably employed over a wide range of operations in many external feedback applications. It should also be understood that similar results could be obtained if the pulsed-solenoid force-balance device A was modified to use the control circuit D.

The pulsed-solenoid force-balance device A can also be modified for adaptation in a pressure control system. For pressure control operations, the cadmium sulfide photocell can be operatively connected to a pressure gauge (not shown) having a dial plate with conventional pressure graduations. The dial plate of the pressure gauge can be conveniently provided with an aperture in direct alignment with the photocell. A light source is then conveniently mounted in alignment with the photocell in the aperture. A control flag is secured to the indicator needle of the pressure gauge and is capable of being shifted to and away from closurewise position across the aperture. As the pressure in a measured variable function is increased, the control needle of the valve will be shifted carrying therewith the control flag. As the control flag shifts across the aperture to its closurewise position, the light incident upon the photocell is reduced. As the light upon the photocell is reduced, the current supplied to the relaxation oscillator is, therefore, reduced. Consequently, it can be seen that the signal received from the sensory transducer is related to the movement of the control flag and is hence related to the change of pressure. It has also been found that pressure control systems which embody the pulsed-solenoid force-balance device A are very stable.

As indicated above, the pulsed-solenoid force-balance device A of the present invention is adaptable for employment in many applications where external feedback is not required. Such applications, as indicated above, are employment as a differential pressure sensor, a pressure transmitter, a flow meter, liquid level detector, etc. By way of illustration, and not of limitation, the versatility of the pulsed-solenoid force-balance device A is exemplified by use as a differential pressure sensor.

The use of the pulsed-solenoid force-balance device as a differential pressure sensor is schematically illustrated in FIGURE 6. By reference thereto, it can be seen that the force-balance device A which consists of the valve B and circuit C or D is connected across a fluid conduit or pipe 100 having an internal restriction 101 thereby forming a high pressure area 102 within the conduit 100 and a low pressure area 103. The force-balance device A is interposed in a by-pass line 104 connected across the high pressure area 102 and the low pressure area 103. A variable reluctance device or vibration sensor 105 is also connected to the solenoid coil. Similarly connected to the output of the coil is an electrical readout device 106.

In order to employ the force-balance device A as a differential pressure sensor, it is necessary to measure the current at an equilibrium or balanced position. The peak current would, therefore, provide the change in pressure. This would be, of course, in relative terms and the electrical readout device 106 could be calibrated in an absolute indicia to give a direct pressure reading as a function of the peak current produced in the solenoid coil. Thus, if it is desired to measure the change of pressure, it is necessary to know when vibration of the valve plunger begins. This, of course, is determined by the variable reluctance device 105. It is also possible to interpose a flow meter in the by-pass line 104 in order to determine when flow begins. These devices will indicate when the valve is at least in its equilibrium position and when flow begins or vibration is initiated. Thereafter, as a change of pressure occurs between the high pressure chamber 102 and the low pressure chamber 103, the flow conditions in the by-pass line 104 will change thereby either increasing or reducing the pressure across the valve orifice. As a result thereof, the amplitude of vibration of the valve plunger will change within the solenoid coil. This will, in turn, produce a change in the electrical output from the solenoid coil. As indicated above, this electrical output is then, in turn, transmitted to the electrical readout device 106. In this manner, it is possible to measure the change of pressure across the fixed restriction 101 in the line 100 by use of the force-balance device A.

A detailed discussion of pulsed-solenoid control action is provided in my copending application Ser. No. 412,921, filed Nov. 23, 1964, now Patent No. 3,424,951, of which this application is a continuation-in-part. However, the following explanation will provide the basic theory of application of the pulsed solenoid action in the force-balance device of the present invention.

Pulsed solenoid control action can be explained by the theory that the plunger is made to vibrate on an orifice by magnetic force and flow control results from controlling the amplitude of the vibrations. This concept therefore permits a quantitative description of the operable range of control. There are two major conditions which must exist under the theory that flow control results from controlled vibration of a plunger. The first condition is that the maximum magnetic force generated by the solenoid coil must be greater than the combined spring and gravity forces which holds the plunger against the valve seat. If this condition did not exist, then vibration of the plunger would be impossible. The second condition is that the magnetic force averaged over the power cycle must be less than the force exerted by the spring. If this did not exist, the plunger would be held against the upper stop for at least a portion of the cycle and the normal hysteresis and instability of conventional solenoid valves would then result. In actuality, the average force must be even less than the theoretical average force due to dynamic instability effects. This vibration concept also suggests that the effective valve area and hence the flow rate is proportional to the time integral of the valve lift over the power cycle.

The explanation of the wide dynamic range of the valve herein described lies in almost complete absence of friction, thereby permitting very low amplitude vibrations. Even though the plunger vibrates at least sixty times a second, long seat life has been experienced as a result of low unbalanced forces on the plunger, so that the maximum seating pressure is well within the elastic range of the Teflon seat.

The existence of the stability criterion, that is to say, no motion at the start of a force cycle, explains the reason for success in the use of a half-wave silicon controlled rectifier power source for obtaining effective control, while amplitude control of a sine wave power source is not effective. By the employment of a silicon controlled rectifier power source, the force pulse is followed by a long period, the quiescent period or negative cycle, in which no force pulse is produced by the solenoid. This allows vibrations to be extinguished prior to the next pulse. When compared to the use of sine wave power, an identical force pulse is produced during the negative cycle, and it is necessary to have the vibrations extinguished before this cycle begins. Reduction of the vibration with a sine wave power source materially restricts the operable range of control. Hence, it can be seen that a far greater dynamic range of control is obtainable with the use of a silicon controlled rectifier power source. It has been found that beyond the point at which the first contact of the valve plunger is made with the valve seat, the flow rate will fall off slightly with increased firing angle and then slowly rise again. Thus, a condition of multiple stable states would be encountered in this region. This, of course, is a situation which should be avoided in automatic flow control. However, by employment of the pulsed-solenoid control valve described in my copending application Ser. No. 457,969 filed May 24, 1965 with the improved seat plunger design, it is possible to eliminate these multiple stable states with transition therebetween. It should be understood that the improved valve plunger-valve seat combination could be successfully employed in the present invention.

The invention is further illustrated by, but not limited to the following examples.

Example 1

This example describes the efficiency and dynamic range of a pulsed-solenoid control valve in the aforementioned copending application, of which this application is a continuation-in-part. The control valve and control circuit described in said aforementioned copending application was combined in order to study the effect of the controllable factors which affect the operation of the control valve. In the control valve, a conventional Teflon seat was employed and prepared for use in a manner to be hereinafter described. Moreover, the valve was not provided with a restriction downstream to create an internal feedback condition. The control valve was a Hoke S90A38OCT solenoid valve which had the following valve dimensions:

| | | |
|---|---|---|
| Plunger weight | g | 16 |
| Plunger outer diameter | cm | 0.92 |
| Plunger stop outer diameter | cm | 0.84 |
| Plunger cross-sectional area | cm.$^2$ | 0.67 |
| Effective axial plunger length | cm | 4.4 |
| Outer shell, outer diameter of plunger | cm | 4.1 |
| Outer shell thickness | cm | 0.159 |
| Orifice diameter | inches | ⅛ |
| Air gap when plunger seated | cm | 0.125 |

The solenoid coil of the control valve is characterized by the following data.

| | | |
|---|---|---|
| Total coil turns | | 4000 |
| DC resistance (including compensator resistors) | ohms | 265 |
| Wire size | ga | 33 |
| Coil inner diameter | cm | 1.35 |
| Coil outer diameter | cm | 2.98 |
| Coil height | cm | 3.15 |

This valve was fitted with a Teflon seat and had an all stainless steel construction. The valve which was constructed of type 430F stainless steel had an initial permeability of 200, a maximum permeability of 1400 and a saturation flux density of 14,000 grams. The orifice formed had a ⅛ inch diameter and orifice seating was milled approximately 0.005 inch from the surface which was followed by polishing with an 1800 grit diamond to a mirror finish.

The parts in FIGURE 3 which form the control circuit and which were used in the experimentation are listed below:

Cadmium sulfide transducer—Light and receiver (relay removed) Sigma 8RCO1A set
Resistor 64—10K, ½-watt
Resistor 64—3500, 10-watt
Resistor 53—300, 1% precision, 2-watt
Resistor 55—47
Resistor 44—100, 2-watt, 1% precision
Thermistor 43—Fenwall 1A23J2
Surge Suppressor 57—Sarkes S-491, 140 v. RMS
Capacitor 52—0.1, 200 μfd.
Diode 56—IN1695
Zener diode 58—IN1779, 22 v.
Unijunction transistor 46—2N1671A
Silicon controlled rectifier 40—2N1597, 200 PIV, 1.6 A
Potentiometer 51—100K, 4-watt wire wound Mallory M100MPK
Potentiometer 50—10K, 4-watt wire wound Mallory M10MPK
Potentiometer 63—100K, 2-watt carbon Ohmite CLU1041
Constant voltage transformer—Sola Cat. No. 23-13-060 60 V.A. at 115 v.

To be of use in a practical control operation, the combination of the controller and valve must be insensitive to ambient temperature changes and line voltage changes. As might be expected from the principle of operation, sensitivity to line voltage variation was found to be considerable. A one percent change in line voltage produced a 40 percent change in flow rate at a constant resistance setting. Powering the control circuit from a Sola constant voltage transformer (Catalogue No. 20-13-060) reduced this change of flow rate to less than 20 percent flow change per percent line voltage change. The sources of ambient temperature arise from the effect of temperature on the solenoid coil resistance and the effect of temperature on the unijunction transistor relaxation oscillator. Both of these effects were eliminated by adjusting the resistors experimentally to produce no flow change on heating the components in question from 25 to 40 degrees C. with a hot air gun. Adjusting the resistor 53 eliminates temperature effects on the unijunction transistor 46 and adjusting the resistor 44 eliminates temperature effects on the solenoid coil 3.

The wide dynamic range of the control system was illustrated in the copending application, which application is a continuation-in-part and illustrates the flow rate as a function of the control resistance and the firing angle in degrees. The average deviation of the points from the smooth curve was ±0.28K ohms or about ±0.5% over a three-week test period. Over shorter periods, such as one hour, deviation was about 0.15%. The long term stability test was continued for 2000 hours to determine ultimate seat wear. Inspection of the seat after this time of use revealed no noticeable wear. An inspection of the controllable factors reveals the remarkable characteristics of pulsed-solenoid control mode of action, such as the wide dynamic range over which modulating flow action can be obtained. It can be seen that this dynamic range is approximately 100 times greater than conventional control valves. Moreover, the response rate of the electrically operable control valve A is approximately 10 times faster than any of the conventional control valves.

Example 2

This example describes the use of the pulsed-solenoid force-balance device A of the present invention and illustrates the excellent stability over a wide range of operations. The Hoke solenoid valve S90A38OCT of Example 1 is employed with a discharge pipe having a 0.050 inch inner diameter connected to the discharge port of the valve. A restriction of 0.010" diameter is formed in the discharge pipe creating a negative feedback condition. Moreover, the valve body is modified so that the intake port is formed immediately beneath the valve seat so that a flow-to-open pattern is maintained in the control valve.

The control circuit C of FIGURE 3 is used in this particular pulsed-solenoid force-balance control valve in order to demonstrate the useful effect of the force caused by the differential pressure across the seat of the valve. It was discovered that as the flow rate through the valve commenced, vibration amplitude was very low and flow began very near the valve plunger lift-off point. It was determined that when the maximum magnetic force equaled the resultant of the other forces on the plunger, the valve plunger began to lift from the valve seat. Thus, it is determined that for a given maximum magnetic force the differential pressure across the valve seat will determine the point when flow through the valve A will commence. In other words, the pulsed-solenoid force-balance device A tends to maintain a constant differential pressure across itself.

The valve may be fed from either a liquid or a gas source and any action which tends to increase the flow through the valve, by increasing the gas or liquid quantity or pressure, also increases the pressure downstream of the valve due to the fixed restriction. This, thereby, creates a pressure internally in the valve chamber and reduces the flow into the valve. This "internal feedback" which is thus created, stabilizes the flow characteristics of the valve, produces a linear control voltage and a linear relation between the control voltage and the pressure between the valve and the fixed restriction.

It was thus determined that the seat area should be as large as possible to take advantage of this differential pressure effect.

Example 3

This example describes the use of the pulsed-solenoid force-balance device A of the present invention with the modified form of control circuit and also illustrates the excellent stability over a wide range of operation. The Hoke solenoid valve S90A38OCT of Example 2 was employed with an orifice having a ⅛ inch I.D. Again, a restriction of 0.010″ is formed in the discharge pipe which had an inner diameter of 0.050″, thereby creating a negative feedback condition. As indicated above, instead of using the control circuit C of FIGURE 3, this example employs the control circuit D illustrated in FIGURE 4. The valve seat was modified to employ a ⅛ inch Teflon disc. Moreover, a 110 volt, 60 cycle per second solenoid coil was employed in the valve.

The various components forming part of the electrical control circuit D are set forth below.

| Reference numeral: | Control circuit D components |
|---|---|
| 81 | 50K ohms. |
| 97 | 10K ohms. |
| 87 | 2.2K ohms. |
| 86 | 4.7. |
| 90 | 3.5K, 10 w. |
| 80 | 10K, 10 turn, 2 watts. |
| 92 | 0.1, 200 volts. |
| 99 | 100, 25 volts. |
| 91 | IN1695. |
| 89 | IN1779, 22 v. Zener. |
| 88 | IN1695. |
| 94 | 2N3250. |
| 82 | 2N1671A. |
| 74 | 2N1597. |

Constant voltage transformer—Sola Resistors in ohms, ½ w. unless specified capacitors in μfd.

In performance of this experiment, the control voltage was 0 and the voltage variation obtained by varying the 10-turn reset potentiometer. At a 1000 potentiometer reading, the voltage between the B+ terminal and the base of the transistor 94 was 3.12 volts. This voltage was determined to be linear with potentiometer setting. The silicon controlled rectifier firing angle was determined by measuring the side of the angle with an oscilloscope. The wave form of the control pulse generated for submission to the solenoid as illustrated in FIGURE 5. The following table illustrates the flow data for various potentiometer settings and downstream pressures in p.s.i.g. Also, the flow rate is listed in cubic centimeters per hour. The last two columns, namely the differential pressure over the differential of potentiometer setting and the differential of flow over differential of potentiometer setting illustrates the basic linearity of the device with the control voltage Y.

FLOW DATA

| | Downstream Pressure Setting, p.s.i.g. | Flow Rate, cc./hr. | $\Delta_p/\Delta_y$ | $\Delta_{flow}/\Delta_y$ |
|---|---|---|---|---|
| Control Voltage: | | | | |
| .685 | | 28 | 300 | 21,800 |
| .690 | 1.5 | 137 | 300 | 28,300 |
| .695 | 3.0 | 275 | 320 | 24,000 |
| .700 | 4.6 | 395 | 380 | 21,000 |
| .705 | 6.5 | 500 | 460 | 26,000 |
| .710 | 8.8 | 630 | 440 | 21,000 |
| .715 | 11.0 | 735 | 440 | 23,000 |
| .720 | 13.2 | 850 | 360 | 6,000 |
| .725 | 15.0 | 880 | 320 | 8,000 |
| .730 | 16.6 | 920 | | |

Figure 7:
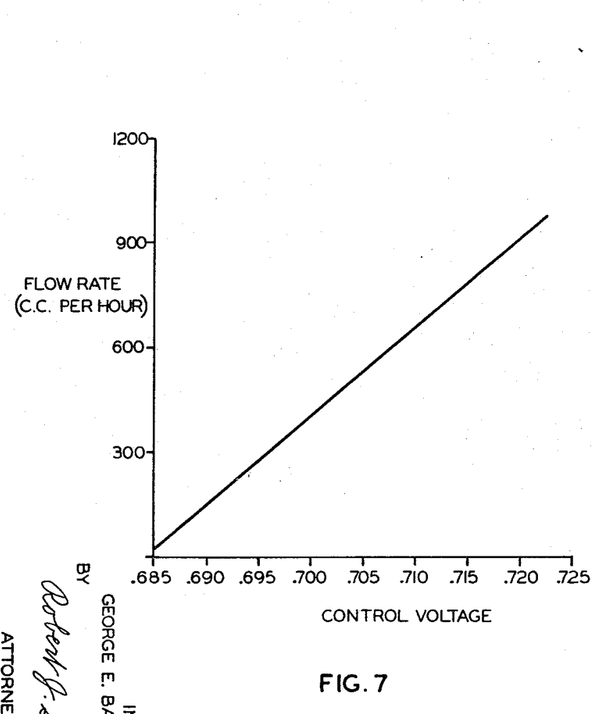
FIGURE 7 is a diagrammatic view illustrating the linearity of control voltage as a function of flow rate.
Figure 8:
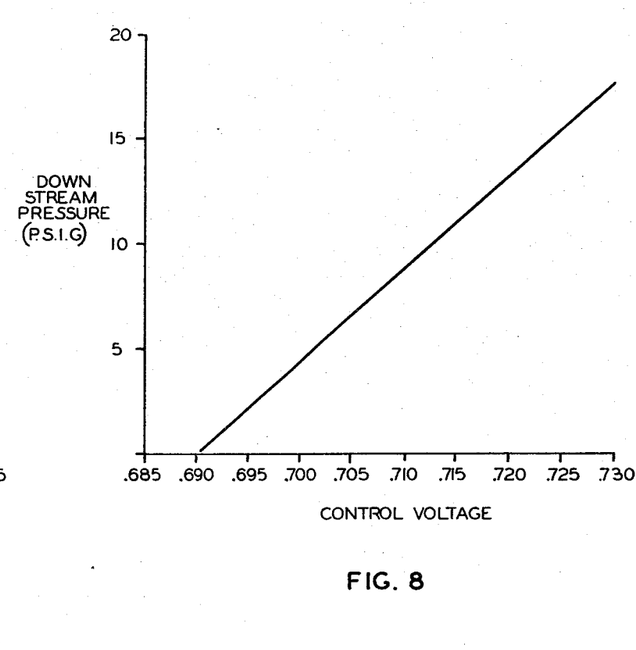
FIGURE 8 is a diagrammatic view illustrating the linearity of the control voltage as a function of downstream pressure.

A number or repeated runs illustrated a flow deviation of only ±9 cubic centimeters per hour or ±0.1 p.s.i.g. average deviation. FIGURE 7 illustrates the effect of the control voltage as a function of flow rate and FIGURE 8 illustrates the effect of the control voltage as a function of the downstream pressure.

Example 4

An actual control operation is demonstrated by using the pulsed-solenoid force-balance control system of Example 3 as a liquid level controller. The sensing method is the refraction setting of the photocell as described in copending application Ser. No. 323,383, filed Nov. 13, 1963. The basic transducer is a cadmium sulfide photocell, the resistance of which decreases with light intensity. A collimated light source is directed perpendicular to the axis of the liquid level tube in a position off-center to the axis of the tube. For this purpose, a 10 mm. O.D. glass tube is used as a level gage and attached to a simulated process vessel containing water at atmospheric pressure. The presence of the liquid in the tube, the index of refraction of which is greater than the index of refraction of the vapor, causes the light beam to be refracted laterally when the liquid is present. The cadmium sulfide light sensitive transducer is incorporated in the control circuit by replacement of the variable resistor 45. Moreover, a pair of resetting potentiometers were connected in the manner illustrated in the aforementioned copending application, of which this application is a continuation-in-part. The transducer was mounted in a lateral position so that its light slit was illuminated when liquid was present and masked by the slit when vapor was present. The receiving window or slit was vertically disposed giving a height of about 0.7″ over which light intensity varied with level. Moreover, it was masked to a width of about 3 mm.

The feedback controller simulated a reboiler level control on a fractionating column. Water was fed to the vessel from the supply at a rate set by a throttling valve in the line. The exit line from the vessel was connected to the inlet of the control valve which in turn discharged to the atmosphere. Thus, the valve would modulate to control the level within the set proportional band regardless of the inlet rate. Reset and proportional band adjustments were made with two potentiometers.

The control valve is fed from a constant pressure source of water at 40 p.s.i.g. at 10° C. The liquid level is set in the process vessel, and the flow rate measured with the valve discharging to atmosphere. These are the conditions that would prevail if the process vessel were operating at 40 p.s.i.g. Settings of the potentiometer are chosen to demonstrate the effects of the wide dynamic range of the control valve. The result is a tenfold change in flow rate over the same level change. With a conventional control valve, this change would have required a change in valve trim. The flow change resulting from a level change of 1.25 to 1.30 inches results from a 0.7% decrease in total circuit resistance.

Example 5

It is possible to employ the aforementioned pulsed-solenoid force-balance device employed in Example 3, in pressure control operations by adapting the cadmium sulfide photocell sensor to make either an upstream or downstream pressure controller. An Ashcroft 4½ inch gauge 0–30 p.s.i.g. is used (Catalogue No. 1297A). The active cadmium sulfide transducer which is an RCA 7163 cell, can be mounted by press-fit into the rear of the gauge case. A small aperture is made in the dial plate of the gauge to allow light to reach the photocell. A light source conveniently made from a Dialco pilot light assembly with a NE-51H bulb is mounted on the case with light directed towards the photocell. A control flag is added to the indicator by using a spare Ashcroft needle with the flags adhesively secured thereto. A second needle is mounted on the hub of the original indicator using an "O" ring to effect a sliding friction set between the two needles. A small groove is cut in the hub with a snap ring added to retain the "O" ring. Thus, the control flag needle can be moved independently of the main indicator needle and an indicating controller is made from this gauge. The flag which is secured to the control needle is designed to mask the hole in the dial so that as the pressure increases, the light is reduced to the photocell. A mechanical stop is soldered to the bracket holding the light assembly so the flag does not swing beyond a certain limit encountered beyond the hole and the lower stop removed so that it does not interfere with the control flag.

This arrangement with the control circuit of FIGURE 3 produces downstream control action. Upstream control action can be obtained by reversing the flag action or by changing the electronic characteristics of the trigger circuit. With the arrangement described, the cadmium sulfide light sensitive transducer varies from a minimum of 30K ohms to 350K ohms over the 0.5 p.s.i.g. proportional band. To prevent oscillations within this narrow proportional band, it is necessary to shunt the photocell with about 30K ohms from the potentiometer. Even with this type of shunt, and a nitrogen supply pressure of 25 p.s.i.g., control at 5 p.s.i.g. shows a drop of only 0.2 p.s.i.g. from the dead shut-off to the maximum stable flow. Again, the speed of response is limited by the inertia of the tube itself and not the control valve.

Having thus described my invention, what I desire to claim and secure by Letters Patent is:

1. A force-balance device comprising a pulsed solenoid operated control valve, said valve having an internal chamber with first and second ports communicating therewith, a movable element disposed within said internal chamber and being movable toward and away from said first port for regulating flow of fluid therethrough, said movable element being continually subjected to a mechanical force including the weight thereof urging said movable element in a first direction with respect to said first port, electromagnetic means operatively associated with said valve for applying force pulses to said movable element for shifting said movable element in a second direction with respect to said first port, means for establishing a pressure differential across said valve, said valve being constructed so that the forces produced by the pressure differential thereacross is large in comparison to the other forces acting on the valve, control means operatively connected to said electromagnetic means for regulating the peak magnetic force so that the movable element will lift from said first port when the pressure differential and peak magnetic force across the valve exceeds the mechanical force, thereby permitting fluid flow through said valve, and means located downstream from said last named port for restricting flow from said last named port.

2. A force-balance device comprising a pulsed solenoid operated control valve, said valve having an internal chamber, first and second ports communicating therewith and a movable element disposed within said chamber and vibrating with respect to said first port thereby regulating fluid flow in proportion to the amplitude of vibration, electrical signal producing means associated with said valve for producing electrical control signals to regulate the amplitude of vibration of said movable element, and means located downstream from said first port for restricting flow from said first port so that the flow from said first port is proportional to the size of said electrical control signals.

3. A force-balance device comprising a pulsed solenoid operated control valve, said valve having an internal chamber, first and second ports communicating therewith and a movable element disposed within said chamber and vibrating with respect to said first port thereby regulating fluid flow in proportion to the amplitude of vibration, electrical signal producing means associated with said valve for producing electrical control signals to regulate the amplitude of vibration of said movable element, mechanical means associated with said movable element for biasing said movable element in a direction opposite to the direction of movement caused by said electrical signal producing means, and means located downstream from said second port for restricting flow from said second port so that the flow from said second port is proportional to the size of said electrical control signals.

4. A force-balance device comprising a pulsed solenoid operated control valve having a valve housing with inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means operatively associated with said electromagnetic means capable of generating control electrical signals for transmission to said electromagnetic means and for causing said plunger to vibrate between said first and second direction, thereby controlling the amount of fluid flow through said valve, and means located downstream from said outlet port for restricting the flow from said outlet port so that the flow from said valve is proportional to the size of said control electrical signals.

5. A differential pressure sensing device comprising a pulsed solenoid operated control valve, said valve having an internal chamber, first and second ports communicating therewith and a movable element disposed within said chamber and vibrating with respect to said first port thereby regulating fluid flow in proportion to the amplitude of vibration, electrical signal producing means associated with said valve for producing electrical control signals to regulate the amplitude of vibration of said movable element, mechanical means associated with said movable element for biasing said movable element in a direction opposite to the direction of movement caused by said electrical signal producing means, and means located downstream from said second port for restricting flow from said second port so that the flow from said second port is proportional to the size of said electrical control signals.

6. A differential pressure sensing device for measuring the change of pressure between two points comprising a pulsed solenoid operated control valve, said valve having an internal chamber, first and second ports communicating therewith and a movable element disposed within said chamber and vibrating with respect to said first port thereby regulating fluid flow in proportion to the amplitude of vibration, electrical signal producing means associated with said valve for producing electrical control signals to regulate the amplitude of vibration of said movable element, mechanical means associated with said movable element for biasing said movable element in a direction opposite to the direction of movement caused by said electrical signal producing means, means located downstream from said second port for restricting flow from said second port so that the flow from said second port is proportional to the size of said electrical control signals, means associated with said valve for sensing the flow of fluid therethrough, and electrical readout means associated with said electrical signal producing means for indicating the size of the electrical signals produced.

7. The method of controlling a dynamically operable device capable of controlling the flow of fluid which has a movable element mechanically biased to a first position and a combination of magnetic means and a fluid pressure differential biasing said movable element to a second position; said method comprising modulating a vibratory action of the movable element in the region where the maximum force exerted by the magnetic means and the pressure differential urging the element to the second position is greater than the maximum force on the movable element biasing same to the first position, and where the average force exerted by the magnetic means and pressure differential is less than the average force of the mechanical means biasing the element to the first position, establishing a large force exerted by the pressure differential in comparison to the other forces acting on said device, restricting the flow of fluid with respect to said device so that the fluid flow is proportional to the force exerted by the magnetic means, and creating an internal negative feedback to increase the stability of the device over its operative range.

8. The method of controlling the action of a solenoid actuable valve capable of controlling the flow of fluid therethrough wherein the solenoid actuable valve includes a plunger disposed within a fluid chamber and spring-biased to a first position and a combination of coil means and a fluid pressure differential biasing the plunger to a second position; said method comprising modulating a vibratory action of the plunger in the region where the maximum force by said coil means and pressure differential urging said plunger to the second position is greater than the maximum force biasing said plunger to the first position, and where the average force exerted by the coil means and pressure differential is less than the average force biasing said plunger to the first position, establishing a large force exerted by the pressure differential in comparison to the other forces acting on said device, restricting the flow of fluid with respect to said device so that the fluid flow is proportional to the force exerted by the magnetic means, and creating an internal negative feedback between the downstream side of said valve and the chamber in which said plunger is located to increase the stability of the valve over its operative range.

9. An electrically operated control valve comprising a valve housing having inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means capable of generating control pulses operatively associated with said electromagnetic means for causing said plunger to vibrate between said first and second direction, thereby controlling the amount of fluid flow through said valve, and means located downstream from said outlet port for restricting flow from said outlet port, thereby creating a negative feedback condition.

10. An electrically operated flow-to-open control valve comprising a valve housing having inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means capable of generating control pulses operatively associated with said electromagnetic means for causing said plunger to vibrate between said first and second direction, thereby controlling the amount of fluid flow through said valve, and means located downstream from said outlet port for restricting flow from said outlet port, thereby creating a negative feedback condition.

11. An electrically operated control valve comprising a valve housing having inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means capable of generating control pulses operatively associated with said electromagnetic means for causing said plunger to vibrate between said first and second direction, thereby controlling the amount of fluid flow through said valve, and means for maintaining a constant balancing of forces between the inlet and outlet port for increasing the stability of the valve.

12. An electrically operated control valve comprising a valve housing having inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means comprising a solid state electronic device capable of generating control pulses operatively associated with said electromagnetic means for causing said plunger to vibrate between said first and second direction, thereby controlling the amount of fluid flow through said valve, and means for maintaining a constant balancing of forces between the inlet and outlet port for increasing the stability of the valve.

13. A transducer comprising a pulsed solenoid operated control valve having a valve housing with inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means operatively associated with said electromagnetic means capable of generating control electrical signals for transmission to said electromagnetic means and for causing said plunger to vibrate between said first and second direction, thereby controlling the amount of fluid flow through said valve, and means located downstream from said outlet port for restricting the flow from said outlet port so that the flow from said valve is proportional to the size of said control electrical signals.

14. An electropneumatic transducer comprising a pulsed-solenoid operated control valve having a valve housing with inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means operatively associated with said electromagnetic means capable of generating control voltage signals for transmission to said electromagnetic means and for causing said plunger to vibrate between said first and second direction, thereby controlling the amount of fluid flow through said valve, and means located downstream from said outlet port for restricting the flow from said outlet port so that the flow from said valve is proportional to the size of said control voltage signals.

15. An electropneumatic transducer comprising a pulsed-solenoid operated control valve having a valve housing with inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from seat, means operatively associated with said electromagnetic means capable of generating control voltage signals for transmission to said electromagnetic means and for causing said plunger to vibrate between said first and second direction, thereby controlling the amount of fluid flow through said valve, and means located downstream from said outlet port for restricting the flow from said outlet port so that the flow from said valve is linearly related to the size of said control voltage signals.

16. A digitalpneumatic transducer comprising a pulsed solenoid operated control valve having a valve housing with inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means operatively associated with said electromagnetic means capable of generating control resistance signals for transmission to said electromagnetic means and for causing said plunger to vibrate between said first and second direction, thereby controlling the amount of fluid flow through said valve, and means located downstream from said outlet port for restricting the flow from said outlet port so that the flow from said valve is proportional to the size of said control voltage signals.

17. An electrically operated control valve comprising a valve housing having inlet and outlet ports, a valve seat associated with one of said ports, said housing having an internal chamber in communication with each of said ports, a movable plunger disposed within the chamber of said housing and being adapted to move to and away from said seat, mechanical means associated with said plunger and biasing said plunger in a first direction toward said seat, electromagnetic means associated with said plunger and biasing said plunger in a second direction away from said seat, means capable of generating control pulses operatively associated with said electromagnetic means for causing said plunger to vibrate between said first and second direction, thereby controlling the amount of fluid flow through said valve, and means for causing the forces produced by a pressure differential across said valve to be large in comparison to the other forces acting on the valve.

18. A force-balance device comprising a pulsed solenoid operated control valve, said valve having an internal chamber with a fluid inlet port and a fluid outlet port communicating therewith, a movable element disposed within said internal chamber and being movable toward and away from said inlet port for regulating flow of fluid therethrough, said movable element being continually subjected to a mechanical force including the weight thereof urging said movable element in a first direction with respect to said inlet port, electromagnetic means operatively associated with said valve for applying force pulses to said movable element for shifting said movable element in a second direction with respect to said inlet port, restriction means located downstream from said valve for establishing a pressure differential across said valve, said valve being constructed so that the forces produced by the pressure differential thereacross is large in comparison to the other forces acting on the valve, and control means operatively connected to said electromagnetic means for regulating the peak magnetic force so that the movable element will lift from said inlet port when the pressure differential and peak magnetic force across the valve exceeds the mechanical force, thereby permitting fluid flow through said valve.

19. The force-balance device of claim 18 further characterized in that said first port has a valve seating mechanism operatively associated therewith.

References Cited
UNITED STATES PATENTS 2,843,147  7/1958  Penther ___________ 251—131

M. CARY NELSON, Primary Examiner

M. O. STURM, Assistant Examiner

U.S. Cl. X.R.

137—624.15; 251—118, 141